United States Patent
Lim et al.

(10) Patent No.: US 8,553,719 B2
(45) Date of Patent: Oct. 8, 2013

(54) MOBILE STATION APPARATUS AND METHOD FOR RECEIVING SIGNAL IN A WIRELESS COMMUNICATION SYSTEM SUPPORTING A PLURALITY OF WIRELESS COMMUNICATION SCHEMES

(75) Inventors: Dong Guk Lim, Gyeonggi-do (KR); Han Gyu Cho, Gyeonggi-do (KR); Jin Young Chun, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 12/964,157

(22) Filed: Dec. 9, 2010

(65) Prior Publication Data
US 2011/0134778 A1    Jun. 9, 2011

Related U.S. Application Data

(60) Provisional application No. 61/267,826, filed on Dec. 9, 2009, provisional application No. 61/289,404, filed on Dec. 23, 2009.

(30) Foreign Application Priority Data

Dec. 8, 2010   (KR) ........................ 10-2010-0125162

(51) Int. Cl.
*H04J 3/16* (2006.01)
*H04L 5/04* (2006.01)

(52) U.S. Cl.
CPC *H04J 3/1605* (2013.01); *H04L 5/04* (2013.01)
USPC ........................................... 370/468; 370/208

(58) Field of Classification Search
CPC ........................................................ H04L 5/04
USPC ......... 370/203, 208–210, 328–330, 337, 319, 370/321, 344, 347, 341, 468, 470, 471, 472
See application file for complete search history.

(56) References Cited

U.S. PATENT DOCUMENTS

2011/0182229 A1 *   7/2011   Park et al. ..................... 370/312

FOREIGN PATENT DOCUMENTS

WO   WO 2009/023808 A1   2/2009

OTHER PUBLICATIONS

"Additional Frame Configuration for Legacy Support Mode (15.3.3. 5.1)," IEEE 802.16 Broadband Wireless Access Working Group <http://ieee802.org/16>, IEEE C802.16M-09/2609r3, Samsung Electronics, Nov. 18, 2009, pp. 1-5.

(Continued)

*Primary Examiner* — Hanh N Nguyen
(74) *Attorney, Agent, or Firm* — Birch, Stewart, Kolasch & Birch, LLP

(57) ABSTRACT

A method and MS apparatus for receiving a signal in a wireless communication system supporting a plurality of wireless communication schemes are disclosed. The method for receiving a signal in a wireless communication system supporting both communication of a first MS using a first wireless communication scheme and communication of a second MS using a second wireless communication scheme includes receiving from a BS a downlink signal in a downlink subframe allocated to a second zone dedicated to communication of the second MS in a downlink zone of a specific frame by the second MS. The number of downlink subframes allocated to the second zone by the BS is one, the allocated downlink subframe is a first downlink subframe of the second zone, and the first downlink subframe of the second zone is a Type-2 subframe which consists of seven OFDMA symbols.

17 Claims, 23 Drawing Sheets

(56) References Cited

OTHER PUBLICATIONS

"Frame Structure Supporting the WirelessMAN-OFDMA Frames," IEEE 802.16 Presentation Submission Template (Rev. 9), IEEE 802.16 Broadband Wireless Access Working Group, IEEE C80216m-09-0475r1, LG Electronics and Samsung Electronics, Mar. 2, 2009, pp. 1-6.

"IEEE 802.16m Amendment Working Document," IEEE 802.16 Broadband Wireless Access Working Group <http://ieee802.org/16>, IEEE 802.16m-08/050, InterDigital Communications, LLC, Dec. 11, 2008, pp. 1-31.

"The Draft IEEE 802.16m System Description Document," IEEE 802.16 Broadband Wireless Access Working Group <http://ieee802.org/16>, IEEE 802.16m-08/003r2, Nokia, Jun. 11, 2008, pp. 1-58.

* cited by examiner

FIG. 3
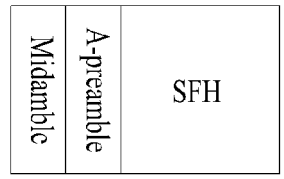
(a)
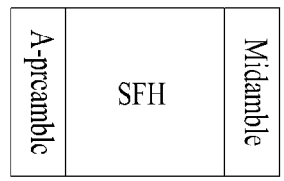
(b)
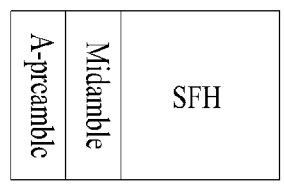
(c)
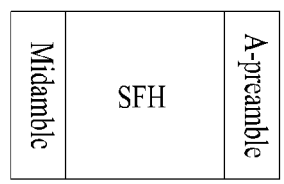
(d)

| DL type3 | DL type1 | DL type3 | DL type2 | DL type1 | UL type1 | UL type1 | UL type1 |
|---|---|---|---|---|---|---|---|

| DL type3 | DL type1 | DL type3 | DL type1 | DL type2 | UL type1 | UL type1 | UL type1 |
|---|---|---|---|---|---|---|---|

| DL type3 | DL type1 | DL type1 | DL type2 | DL type3 | UL type1 | UL type1 | UL type1 |
|---|---|---|---|---|---|---|---|

| DL type3 | DL type2 | DL type3 | DL type1 | DL type1 | UL type1 | UL type1 | UL type1 |
|---|---|---|---|---|---|---|---|

| DL type3 | DL type1 | DL type2 | DL type3 | DL type1 | UL type1 | UL type1 | UL type1 |
|---|---|---|---|---|---|---|---|

| DL type3 | DL type1 | DL type1 | DL type2 | DL type3 | UL type1 | UL type1 | UL type1 |
|---|---|---|---|---|---|---|---|

| DL type3 | DL type2 | DL type1 | DL type1 | DL type3 | UL type1 | UL type1 | UL type1 |
|---|---|---|---|---|---|---|---|

| DL type3 | DL type1 | DL type2 | DL type3 | DL type1 | UL type1 | UL type1 | UL type1 |
|---|---|---|---|---|---|---|---|

| DL type3 | DL type1 | DL type1 | DL type2 | DL type3 | UL type1 | UL type1 | UL type1 |
|---|---|---|---|---|---|---|---|

| DL type3 | DL type1 | DL type2 | DL type1 | DL type3 | UL type1 | UL type1 | UL type1 |
|---|---|---|---|---|---|---|---|

| DL type3 | DL type1 | DL type1 | DL type3 | DL type2 | UL type1 | UL type1 | UL type1 |
|---|---|---|---|---|---|---|---|

| DL type3 | DL type3 | DL type2 | DL type1 | DL type1 | UL type1 | UL type1 | UL type1 |
|---|---|---|---|---|---|---|---|

| DL type3 | DL type1 | DL type2 | DL type3 | DL type1 | UL type1 | UL type1 | UL type1 |
|---|---|---|---|---|---|---|---|

| DL type3 | DL type2 | DL type3 | DL type1 | DL type1 | UL type1 | UL type1 | UL type1 |
|---|---|---|---|---|---|---|---|

| DL type3 | DL type2 | DL type1 | DL type3 | DL type1 | UL type1 | UL type1 | UL type1 |
|---|---|---|---|---|---|---|---|

| DL type3 | DL type1 | DL type2 | DL type3 | DL type1 | UL type1 | UL type1 | UL type1 |
|---|---|---|---|---|---|---|---|

| DL type3 | DL type1 | DL type2 | DL type1 | DL type3 | UL type1 | UL type1 | UL type1 |
|---|---|---|---|---|---|---|---|

| DL type3 | DL type2 | DL type1 | DL type1 | DL type3 | UL type1 | UL type1 | UL type1 |
|---|---|---|---|---|---|---|---|

| DL type3 | DL type2 | DL type3 | DL type1 | DL type1 | UL type1 | UL type1 | UL type1 |

| DL type3 | DL type2 | DL type1 | DL type3 | DL type1 | UL type1 | UL type1 | UL type1 |

| DL type3 | DL type2 | DL type1 | DL type1 | DL type3 | UL type1 | UL type1 | UL type1 |

| DL type3 | DL type1 | DL type2 | DL type1 | DL type3 | UL type1 | UL type1 | UL type1 |

| DL type3 | DL type1 | DL type1 | DL type1 | DL type1 | UL type1 | UL type1 | UL type1 |
|---|---|---|---|---|---|---|---|

| DL type3 | DL type1 | DL type1 | DL type3 | 1 sym | DL type1 | UL type1 | UL type1 | UL type1 |
|---|---|---|---|---|---|---|---|---|

(a)

L:M = 3:2

| DL type3 | DL type1 | DL type1 | DL type1 | DL type1 | UL type1 | UL type1 | UL type1 |
|---|---|---|---|---|---|---|---|

| DL type3 | DL type1 | DL type3 | 1 sym | DL type1 | DL type1 | UL type1 | UL type1 | UL type1 |
|---|---|---|---|---|---|---|---|---|

| DL type3 | DL type1 | DL type1 | 1 sym | DL type1 | DL type3 | UL type1 | UL type1 | UL type1 |
|---|---|---|---|---|---|---|---|---|

| DL type1 | DL type1 | DL type1 | DL type1 | DL type3 | UL type1 | UL type1 | UL type1 |
|---|---|---|---|---|---|---|---|

| DL type1 | DL type1 | DL type3 | 1 sym | DL type1 | DL type3 | UL type1 | UL type1 | UL type1 |
|---|---|---|---|---|---|---|---|---|

(b)

L:M = 2:3

| DL type3 | DL type1 | DL type1 | DL type1 | DL type1 | UL type1 | UL type1 | UL type1 |
|---|---|---|---|---|---|---|---|

| DL type3 | DL type3 | 1 sym | DL type1 | DL type1 | DL type1 | UL type1 | UL type1 | UL type1 |
|---|---|---|---|---|---|---|---|---|

| DL type3 | DL type1 | 1 sym | DL type1 | DL type3 | DL type1 | UL type1 | UL type1 | UL type1 |
|---|---|---|---|---|---|---|---|---|

| DL type1 | DL type1 | DL type1 | DL type1 | DL type3 | UL type1 | UL type1 | UL type1 |
|---|---|---|---|---|---|---|---|

(c)

L:M = 1:4

| DL type1 | DL type1 | DL type1 | DL type1 | DL type3 | UL type1 | UL type1 | UL type1 |
|---|---|---|---|---|---|---|---|

| DL type3 | 1 sym | DL type1 | DL type1 | DL type1 | DL type3 | UL type1 | UL type1 | UL type1 |
|---|---|---|---|---|---|---|---|---|

| DL type1 | 1 sym | DL type1 | DL type1 | DL type3 | DL type3 | UL type1 | UL type1 | UL type1 |
|---|---|---|---|---|---|---|---|---|

| TDD | DL type3 | DL type2 | DL type3 | DL type1 | DL type1 | UL type1 | UL type1 | UL type1 |
|---|---|---|---|---|---|---|---|---|

| FDD | DL/UL type1 | DL/UL type1 | DL/UL type1 | DL/UL type1 | DL/UL type1 | DL/UL type1 | DL/UL type1 | DL/UL type1 |
|---|---|---|---|---|---|---|---|---|
|  | DL/UL type1 | DL/UL type2 | DL/UL type3 | DL/UL type1 | DL/UL type1 | DL/UL type1 | DL/UL type1 | DL/UL type1 |

| | | | | | | | | |
|---|---|---|---|---|---|---|---|---|
| 1110 — 16e | 3 symbol | DL type2 | DL type3 | DL type1 | DL type1 | UL type4 | UL type1 | |
| 1120 — 16m | | DL type2 | Not used | Not used | Not used | UL type4 | UL type1 | Not used |
| 1130 — 16e | DL type3 | DL type2 | DL type3 | DL type3 | DL type3 | UL type4 | UL type1 | |
| 1140 — 16m | | DL type2 | Not used | Not used | Not used | UL type4 | UL type1 | Not used |

| 3 symbol | DL type2 | DL type3 | DL type1 | DL type1 | UL type4 | UL type1 |
|---|---|---|---|---|---|---|

| DL type3 | DL type2 | DL type3 | DL type3 | DL type3 | UL type4 | UL type1 |
|---|---|---|---|---|---|---|

(a)

L:M = 2:3

| 3 symbol | DL type2 | DL type3 | DL type1 | DL type1 | UL type4 | UL type1 |
|---|---|---|---|---|---|---|

| DL type3 | DL type2 | DL type3 | DL type3 | DL type3 | UL type4 | UL type1 |
|---|---|---|---|---|---|---|

(b)

L:M = 1:4

| 3 symbol | DL type2 | DL type3 | DL type1 | DL type1 | UL type4 | UL type1 |
|---|---|---|---|---|---|---|

| DL type3 | DL type2 | DL type3 | DL type3 | DL type3 | UL type4 | UL type1 |
|---|---|---|---|---|---|---|

| DL type3 | DL type1 | DL type3 | DL type3 | DL type1 | UL type4 | UL type1 |
|---|---|---|---|---|---|---|

| DL type3 | DL type1 | DL type1 | DL type3 | DL type3 | UL type4 | UL type1 |
|---|---|---|---|---|---|---|

| DL type3 | DL type3 | DL type3 | DL type1 | DL type1 | UL type4 | UL type1 |
|---|---|---|---|---|---|---|

| DL type3 | DL type3 | DL type3 | DL type1 | DL type1 | UL type4 | UL type1 |
|---|---|---|---|---|---|---|

(a)

L:M = 3:2

| DL type3 | DL type1 | DL type1 | DL type3 | DL type3 | UL type4 | UL type1 |
|---|---|---|---|---|---|---|

| DL type3 | DL type1 | DL type3 | DL type1 | DL type3 | UL type4 | UL type1 |
|---|---|---|---|---|---|---|

| DL type3 | DL type1 | DL type1 | DL type3 | DL type3 | UL type4 | UL type1 |
|---|---|---|---|---|---|---|

| DL type3 | DL type3 | DL type3 | DL type1 | DL type1 | UL type4 | UL type1 |
|---|---|---|---|---|---|---|

(b)

L:M = 2:3

| DL type3 | DL type1 | DL type3 | DL type3 | DL type1 | UL type4 | UL type1 |
|---|---|---|---|---|---|---|

| DL type3 | DL type1 | DL type1 | DL type3 | DL type3 | UL type4 | UL type1 |
|---|---|---|---|---|---|---|

| DL type3 | DL type1 | DL type1 | DL type3 | DL type3 | UL type4 | UL type1 |
|---|---|---|---|---|---|---|

(c)

L:M = 1:4

| DL type3 | DL type1 | DL type1 | DL type3 | DL type3 | UL type4 | UL type1 |
|---|---|---|---|---|---|---|

| DL type1 | DL type1 | DL type3 | DL type3 | DL type3 | UL type4 | UL type1 |
|---|---|---|---|---|---|---|
| DL type3 | DL type3 | DL type1 | DL type1 | DL type3 | UL type4 | UL type1 |
| DL type3 | DL type3 | DL type1 | DL type3 | DL type1 | UL type4 | UL type1 |
| DL type3 | DL type3 | DL type1 | DL type1 | DL type3 | UL type4 | UL type1 |
| DL type3 | DL type3 | DL type1 | DL type3 | DL type1 | UL type4 | UL type1 |
| DL type3 | DL type3 | DL type1 | DL type1 | DL type3 | UL type4 | UL type1 |

(a)

L:M = 3:2

| DL type1 | DL type1 | DL type3 | DL type3 | DL type3 | UL type4 | UL type1 |
|---|---|---|---|---|---|---|
| DL type3 | DL type3 | DL type1 | DL type3 | DL type1 | UL type4 | UL type1 |
| DL type3 | DL type3 | DL type1 | DL type1 | DL type3 | UL type4 | UL type1 |

(b)

L:M = 2:3

| DL type1 | DL type1 | DL type3 | DL type3 | DL type3 | UL type4 | UL type1 |
|---|---|---|---|---|---|---|
| DL type3 | DL type3 | DL type1 | DL type1 | DL type3 | UL type4 | UL type1 |
| DL type3 | DL type3 | DL type1 | DL type3 | DL type1 | UL type4 | UL type1 |

(c)

L:M = 1:4

| DL type1 | DL type1 | DL type3 | DL type3 | DL type3 | UL type4 | UL type1 |
|---|---|---|---|---|---|---|

(d)

FIG. 15
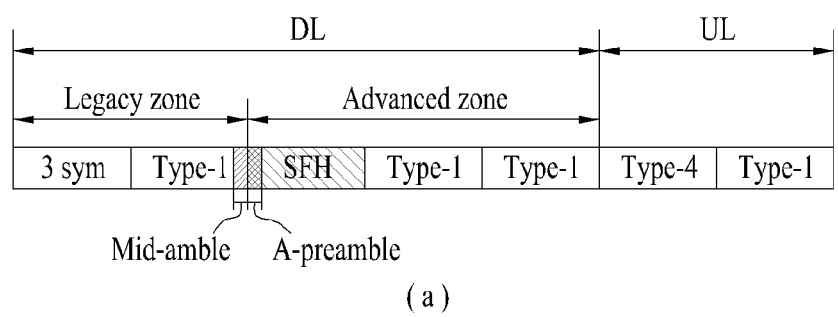
(a)
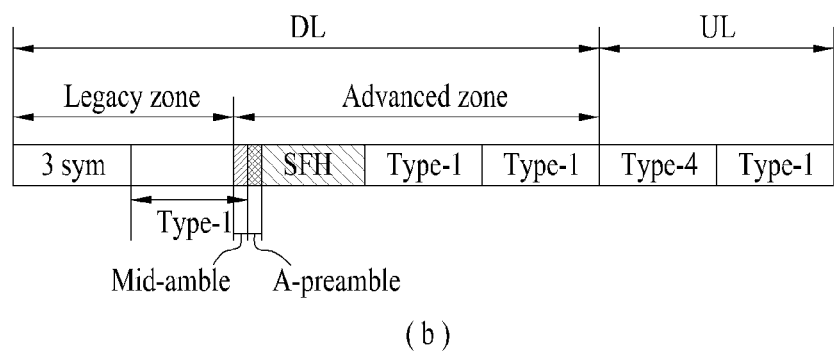
(b)

| 3 symbol | DL type1 | DL type1 | DL type1 | DL type1 | UL type1 | UL type4 |
|---|---|---|---|---|---|---|

| 3 symbol | DL type1 | DL type1 | DL type3 | 1 sym | DL type1 | UL type1 | UL type4 |
|---|---|---|---|---|---|---|---|

(a)

L:M = 3:2

| 3 symbol | DL type1 | DL type1 | DL type1 | DL type1 | UL type1 | UL type4 |
|---|---|---|---|---|---|---|

| 3 symbol | DL type1 | DL type3 | 1 sym | DL type1 | DL type1 | UL type1 | UL type4 |
|---|---|---|---|---|---|---|---|

| 3 symbol | DL type1 | DL type1 | 1 sym | DL type1 | DL type3 | UL type1 | UL type4 |
|---|---|---|---|---|---|---|---|

(b)

L:M = 2:3

| 3 symbol | DL type1 | DL type1 | DL type1 | DL type1 | UL type1 | UL type4 |
|---|---|---|---|---|---|---|

| 3 symbol | DL type3 | 1 sym | DL type1 | DL type1 | DL type1 | UL type1 | UL type4 |
|---|---|---|---|---|---|---|---|

| 3 symbol | DL type1 | 1 sym | DL type1 | DL type1 | DL type3 | UL type1 | UL type4 |
|---|---|---|---|---|---|---|---|

(c)

L:M = 1:4

| 3 symbol | DL type1 | DL type1 | DL type1 | DL type1 | UL type1 | UL type4 |
|---|---|---|---|---|---|---|

| 3 symbol | 1 sym | DL type1 | DL type1 | DL type1 | DL type3 | UL type1 | UL type4 |
|---|---|---|---|---|---|---|---|

| DL type1 | DL type2 | DL type2 | DL type2 | UL type4 | UL type1 |

(a)

| DL type2 | DL type1 | DL type2 | DL type2 | UL type4 | UL type1 |

(b)

| DL type2 | DL type2 | DL type1 | DL type2 | UL type4 | UL type1 |

(c)

| DL type2 | DL type2 | DL type2 | DL type1 | UL type4 | UL type1 |

| DL type3 | DL type2 | DL type3 | DL type3 | DL type3 | UL type4 | UL type1 |
|---|---|---|---|---|---|---|

(a)

| DL/UL type1 | DL/UL type1 | DL/UL type1 | DL/UL type2 | DL/UL type1 | DL/UL type1 | DL/UL type1 |
|---|---|---|---|---|---|---|

(b)

FIG. 19
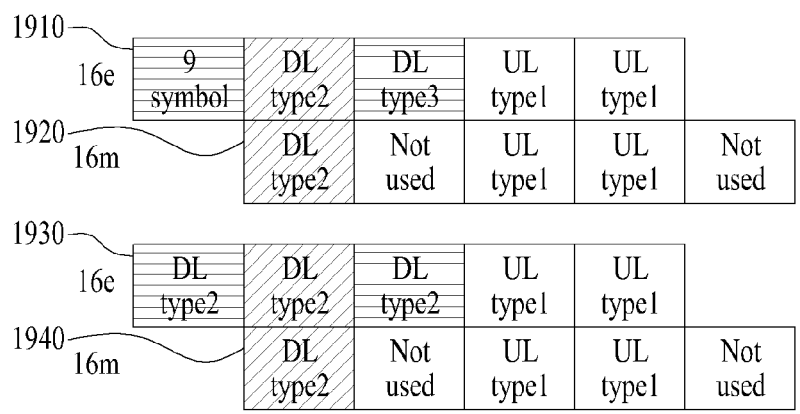
(a)
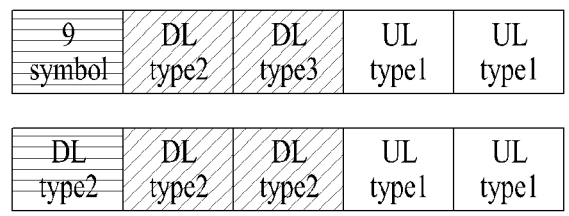
(b)

FIG. 20

| DL type2 | DL type2 | DL type2 | UL type1 | UL type1 |
|---|---|---|---|---|

TDD

FDD

| DL/UL type2 | DL/UL type2 | DL/UL type2 | DL/UL type1 | DL/UL type1 |
|---|---|---|---|---|
| DL/UL type1 | DL/UL type2 | DL/UL type2 | DL/UL type2 | DL/UL type1 |

FIG. 21
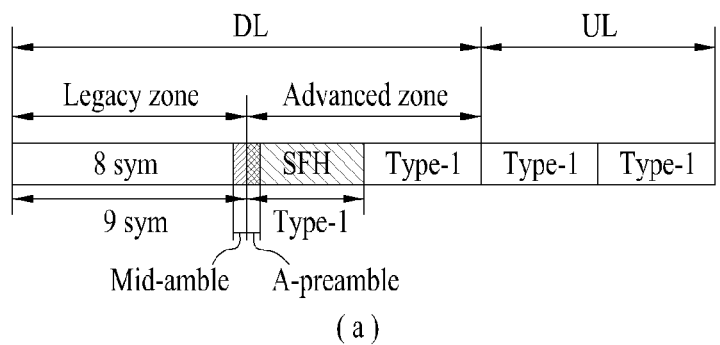
(a)
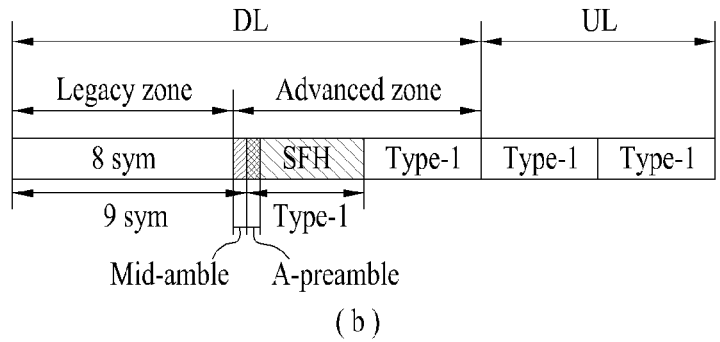
(b)
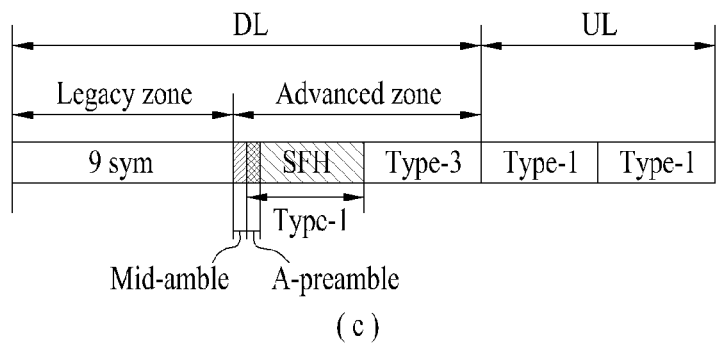
(c)

FIG. 22
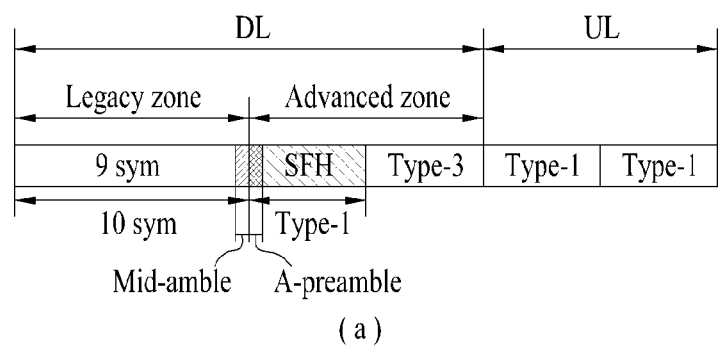
(a)
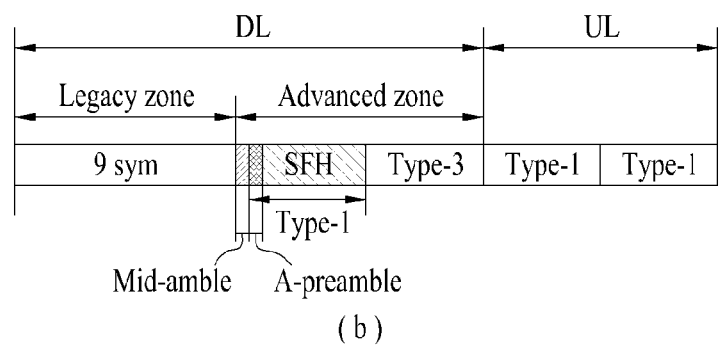
(b)

FIG. 23
L:M = 2:1
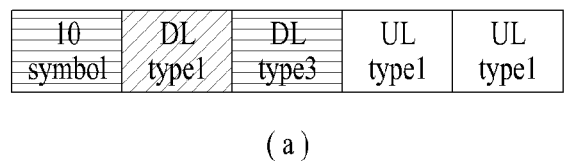
(a)
L:M = 1:2
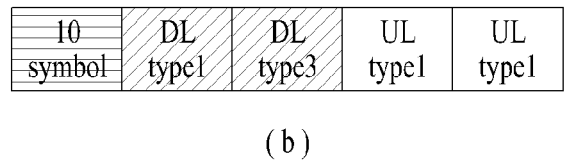
(b)

MOBILE STATION APPARATUS AND METHOD FOR RECEIVING SIGNAL IN A WIRELESS COMMUNICATION SYSTEM SUPPORTING A PLURALITY OF WIRELESS COMMUNICATION SCHEMES

Pursuant to 35 U.S.C. §119(a), this application claims the benefit of priority to Provisional Application No. 61/267,826, filed on Dec. 9, 2009 and Provisional Application No. 61/289,404, filed on Dec. 23, 2009, the contents of which are incorporated by reference herein in their entirety.

Pursuant to 35 U.S.C. §119(e), this application claims the benefit of priority to Korean application No. 10-2010-0125162 filed on Dec. 8, 2010, the contents of which are incorporated by reference herein in their entirety.

BACKGROUND OF THE INVENTION

1. Field of the Invention

The present invention relates to wireless communication, and more particularly, to a method for receiving a signal and a Mobile Station (MS) apparatus using the same in a wireless communication system supporting a plurality of wireless communication schemes.

2. Discussion of the Related Art

An Institute of Electrical and Electronics Engineers (IEEE) 802.16m system supports both Frequency Division Duplex (FDD) including Half-FDD (H-FDD) and Time Division Duplex (TDD). The IEEE 802.16m system adopts Orthogonal Frequency Division Multiple Access (OFDMA) for Downlink (DL) and Uplink (UL).

Now a brief description will be given of an IEEE 802.16m frame structure.

FIG. 1 illustrates a basic frame structure in the IEEE 802.16m system.

Referring to FIG. 1, each 20-ms superframe is divided into four equally-sized 5-ms radio frames. The superframe starts with a SuperFrame Header (SFH). For a channel bandwidth of 5 MHz, 10 MHz, or 20 MHz, each 5-ms radio frame may include eight subframes. Each subframe is allocated for DL or UL transmission. There are four types of subframes:

1) Type-1 subframe which consists of six OFDMA symbols;
2) Type-2 subframe which consists of seven OFDMA symbols;
3) Type-3 subframe which consists of five OFDMA symbols; and
4) Type-4 subframe which consists of nine OFDMA symbols. This type shall be applied only to a UL subframe for the 8.75-MHz channel bandwidth when supporting Wireless Metropolitan Area Network (WirelessMAN)-OFDMA frames.

The basic frame structure is applicable to FDD and TDD schemes, including H-FDD MS operations. The number of switching points in each radio frame in TDD systems is 2, where a switching point is defined as a change of directionality, i.e., from DL to UL or from UL to DL.

A frame structure that supports both legacy MSs (e.g. 16e MSs) and Advanced MSs (AMSs) (e.g. 16m MSs) is yet to be specified for the IEEE 802.16m system.

SUMMARY OF THE INVENTION

Accordingly, the present invention is directed to a method and mobile station apparatus for receiving a signal in a wireless communication system supporting a plurality of wireless communication schemes that substantially obviate one or more problems due to limitations and disadvantages of the related art.

An object of the present invention is to provide a method for receiving a signal in a wireless communication system supporting a plurality of wireless communication schemes.

Another object of the present invention is to provide a Mobile Station (MS) apparatus for receiving a signal in a wireless communication system supporting communication of a plurality of MSs using two or more different wireless communication schemes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving a signal in a wireless communication system supporting communication of a first MS using a first wireless communication scheme and communication of a second MS using a second wireless communication scheme includes receiving from a BS a downlink signal in a downlink subframe allocated to a second zone dedicated to communication of the second MS in a downlink region of a specific frame by the second MS. The number of downlink subframes allocated to the second zone by the BS is one, the allocated downlink subframe is a first downlink (DL) subframe of the second zone, and the first downlink subframe of the second zone is a Type-2 subframe which consists of seven OFDMA symbols.

The second MS may receive a preamble through a first OFDMA symbol of the first downlink subframe of the second zone. The second MS may receive a midamble through a last OFDMA symbol of the first downlink subframe of the second zone. The second MS may receive downlink data through five OFDMA symbols of the first downlink subframe of the second zone.

The specific frame may have a channel bandwidth of one of 5 MHz, 10 MHz, 20 MHz, 8.75 MHz, and 7 MHz.

If the specific frame is a Time Division Duplex (TDD) frame having a channel bandwidth of one of 5 MHz, 10 MHz and 20 MHz, a ratio of a number of downlink subframes to a number of uplink subframes in the specific frame may be 5:3. If the specific frame is a Time Division Duplex (TDD) frame having a channel bandwidth of 8.75 MHz, a ratio of a number of downlink subframes to a number of uplink subframes in the specific frame may be 5:2. If the specific frame is a Time Division Duplex (TDD) frame having a channel bandwidth of 7 MHz, a ratio of a number of downlink subframes to a number of uplink subframes in the specific frame may be 3:2.

The method may further comprise receiving frame configuration information including information about a downlink subframe allocated to the second MS in the specific frame from the BS by the second MS.

The first MS may use a Wireless Metropolitan Area Network (WirelessMAN) OFDMA frame, and the second MS may use an Advanced Air Interface (AAI) frame.

The first downlink subframe of the second zone may be behind a first downlink subframe of a first zone used for communication of the first MS by one or two subframes.

In another aspect of the present invention, an MS apparatus for receiving a signal in a wireless communication system supporting communication of a plurality of MSs using a plurality of different wireless communication schemes includes a receiver for receiving from a BS a downlink signal in a downlink subframe allocated to a second zone in a downlink region of a specific frame, the second zone being dedicated to a second communication scheme among the plurality of wireless communication schemes. The number of downlink subframes allocated to the second zone by the BS is 1, the allocated downlink subframe is a first downlink subframe of the second zone, and the first downlink subframe of the second zone is a Type-2 subframe including seven OFDMA symbols.

The MS may further comprise a processor for measuring a downlink channel state of a subframe dedicated to the second zone using a received midamble.

The receiver may further receive frame configuration information including information about a subframe allocated to the second zone in the specific frame from the BS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 illustrates exemplary M-zone subframe structures in a frame supporting both a legacy Mobile Station (MS) and an Advanced MS (AMS).

FIGS. 4 to 7 illustrate exemplary frame structures with different ratios between Downlink (DL) L-zone subframes and DL M-zone subframes for a channel bandwidth of 5, 10 or 20 MHz, which are designed to support both a legacy MS and an AMS.

FIG. 9 illustrates exemplary frame structures with different ratios between DL L-zone subframes and DL M-zone subframes, when one symbol is used as a midamble in the midamble transmission methods according to the embodiments of the present invention illustrated in FIG. 8.

FIG. 10 illustrates a TDD AAIF structure and FDD AAIF structures.

FIGS. 11 and 12 illustrate exemplary frame structures with different ratios between DL L-zone subframes and DL M-zone subframes for a channel bandwidth of 8.75 MHz, which are designed to support both legacy MSs and AMSs.

FIG. 13 illustrates other exemplary frame structures with different ratios between DL L-zone subframes and DL M-zone subframes for a channel bandwidth of 8.75 MHz, which are designed to support both legacy MSs and AMSs.

FIG. 14 illustrates other exemplary frame structures with different ratios between DL L-zone subframes and DL M-zone subframes for a channel bandwidth of 8.75 MHz, which are designed to support both legacy MSs and AMSs.

FIG. 15 illustrates exemplary methods for transmitting a midamble in a frame structure for a channel bandwidth of 8.75 at a BS.

FIG. 16 illustrates exemplary frame structures with different ratios between DL L-zone subframes and DL M-zone subframes, when one symbol carries a midamble in the midamble transmission methods illustrated in FIG. 15.

FIG. 17 illustrates exemplary frame structures for a channel bandwidth of 8.75 MHz, designed to support legacy MSs.

FIG. 18 illustrates frame structures for a channel bandwidth of 5, 10 or 20 MHz, configured for subframe alignment between a frame supporting only legacy MSs and a frame supporting only AMSs in a multi-carrier operation.

FIG. 19 illustrates exemplary frame structures with different ratios between DL L-zone subframes and DL M-zone subframes for a channel bandwidth of 7 MHz, designed to support both legacy MSs and AMSs.

FIG. 20 illustrates exemplary frame structures for a channel bandwidth of 7 MHz, configured for subframe alignment between a frame supporting only legacy MSs and a frame supporting only AMSs in a multi-carrier operation.

FIG. 21 illustrates exemplary methods for transmitting a midamble in a frame structure for a channel bandwidth of 7 MHz at a BS.

FIG. 22 illustrates exemplary methods for transmitting a midamble in a frame structure for a channel bandwidth of 7 MHz at a BS.

FIG. 23 illustrates frame structures with different ratios between DL L-zone subframes and DL M-zone subframes for a channel bandwidth of 7 MHz, designed to support both legacy MSs and AMSs based on the frame structures illustrated in FIG. 22.

DETAILED DESCRIPTION OF THE INVENTION

Figure 1:
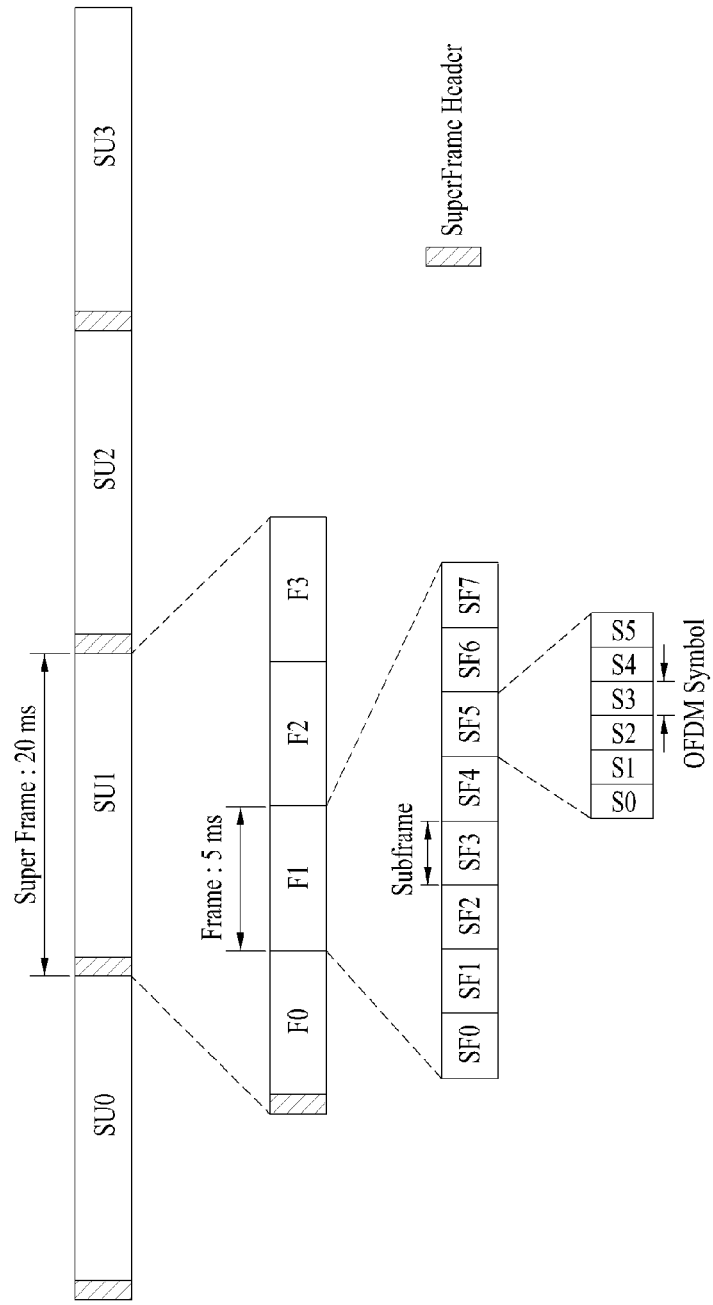
FIG. 1 illustrates a basic frame structure in an Institute of Electrical and Electronics Engineers (IEEE) 802.16m system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

For example, the following detailed description is given under the assumption that a $3^{rd}$ Generation Partnership Project (3GPP) Long Term Evolution (LTE) system is being used. However, the description is applicable to any other mobile communication system except for specific features inherent to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "Mobile Station (MS)" generically refers to a mobile or fixed user terminal device such as a User Equipment (UE), an Advanced MS (AMS), etc. and the term 'Base Station (BS)' is assumed to refer to any node of a network end, such as a Node B, an enhanced Node B (eNB or eNode B), an Access Point (AP), etc., communicating with an MS.

In a mobile communication system, an MS may receive information from a BS on a DownLink (DL) and may transmit information to the BS on an UpLink (UL). The information transmitted from or received at the MS may include data and control information, and a variety of physical channels is defined according to the types and usages of the transmission and received information.

In a mobile communication system such as an Institute of Electrical and Electronics Engineers (IEEE) 802.16m system, Orthogonal Frequency Division Multiplexing (OFDM) is used as a multiple carrier modulation scheme. The basic principle of OFDM will be described briefly below.

An OFDM system divides a high-rate data stream into a number of low-rate data streams to simultaneously transmit them on multiple carriers. These carriers are called subcarriers. Due to orthogonality between subcarriers, a receiver can detect the subcarriers even though the frequency components of a carrier are overlapped with one another. Specifically, the high-rate data stream is converted to a plurality of parallel low-rate data streams at a Serial-to-Parallel Converter (SPC). The parallel data streams are multiplied by subcarriers and then combined. The combined signal is transmitted to the receiver.

The plurality of parallel data streams are subjected to Inverse Discrete Fourier Transform (IDFT), prior to transmission on the subcarriers. IDFT may be efficiently implemented using Inverse Fast Fourier Transform (IFFT). Since the symbol duration of low-rate subcarriers increases, a relative signal dispersion in time, caused by a multipath delay spread, is reduced.

To reduce Inter-Symbol Interference (ISI) for wireless OFDM communication, a guard interval longer than the delay spread of a channel may be inserted between symbols. That is, while each symbol is transmitted on multi-path channels, a guard interval longer than the delay spread of the channels is inserted between successive symbols. A copy of the last part (i.e. guard interval) of a useful symbol is added before the symbol in order to maintain orthogonality between subcarriers. This is called a Cyclic Prefix (CP).

Figure 2:
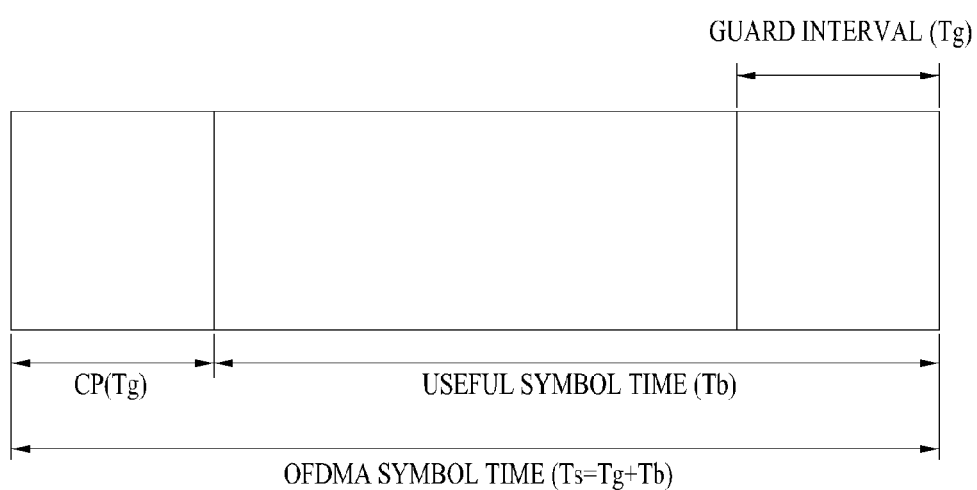
FIG. 2 illustrates an exemplary symbol structure including a Cyclic Prefix (CP).

FIG. 2 illustrates an exemplary symbol structure including a CP.

Referring to FIG. 2, a symbol time Ts is the sum of a useful symbol time Tb and a guard interval (i.e. a CP time) Tg. A receiver first removes the CP (of length Tg) from a received symbol and then demodulates the data of the useful symbol time Tb. A transmitter and a receiver may synchronize with each other and maintain orthogonality between data symbols, using a CP.

The following description will be disclosed a legacy system and an advanced system with IEEE 802.16 systems, for example. The legacy system may be a system using a communication scheme before the emergence of IEEE 802.16m, for example, an IEEE 802.16e system. In the context of IEEE 802.16 systems, frame structures supporting a legacy system, Wireless Metropolitan Area Network (WirelessMAN)-OFDMA and an advanced system, Advanced Air Interface (AAI) will be described below. The types or definitions of the legacy system and the advanced system are purely exemplary, which should not be construed as limiting the present invention.

An MS operating in an advanced mobile communication system such as an IEEE 802.16m system will be referred to as '16m MS' or 'AMS', whereas an MS operating in a legacy system will be referred to as 'legacy MS' or '16e MS'. The term 'MS' may cover '16m MS' and 'legacy MS' in its meaning.

Legacy support means supporting WirelessMAN-OFDMA using AAI Frames (AAIFs) in an advanced system. An M zone is defined in the AAIF to support AMSs, including subframes or symbols. A Legacy (L) zone is also defined in the AAIF to support WirelessMAN-OFDMA MSs (i.e. legacy MSs), including subframes or symbols. A Greenfield operation is an operation for transmitting data in an existing frame structure defined for communication between a BS and an MS in a system, without modifying the frame structure. In other words, the Greenfield operation refers to an operation for supporting legacy MSs using an AAIF designed for AMSs. Herein, the term 'symbol' refers mainly to but is not limited to an OFDMA symbol.

AMSs (e.g. 16m MSs) and legacy MSs (e.g. 16e MSs) may co-exist in a cell. To support the co-existence between the AMSs and the legacy MSs, an L zone and an M zone need to be defined in a frame. A frame may be configured at various L-M zone ratios depending on the numbers of symbols or subframes allocated to the L zone and the M zone. If one subframe is allocated to the M zone, the M-zone subframe needs to include all necessary control signals such as an A-preamble, a SuperFrame Header (SFH), and a midamble.

Therefore, for a BS to transmit all of the control signals in the M zone, the M-zone subframe needs to be configured to be a Type-2 subframe which consists of seven symbols. The Type-2 subframe allocated to the M zone is preferably located at any position other than the first subframe of a DL frame. That is, the first subframe of the DL frame is preferably allocated to the L zone. For instance, if a DL frame consists of five subframes, the Type-2 subframe which consists of seven symbols may be located at any of second to fifth DL subframe positions.

Considering the position of an SFH that needs to be fixed to a specific position in the Type-2 subframe which consists of seven symbols irrespective to the ratio of number of DL L-zone subframes to the number of DL M-zone subframes and the processing time of a midamble transmitted for measuring the channel state of the Type-2 subframe, it is preferred that the BS transmits the Type-2 subframe as early as possible and thus allocates the Type-2 subframe to the second DL subframe position. The BS may transmit control signals such as an A-preamble, an SFH, and a midamble through the Type-2 subframe in the manners illustrated in FIG. 3.

FIG. 3 illustrates exemplary M-zone subframe structures in a frame supporting both legacy MSs and AMSs.

Referring to FIG. 3(a), an M-zone subframe may start with a midamble followed by an A-preamble and an SFH. Referring to FIG. 3(b), an A-preamble, an SFH, and a midamble may be sequentially allocated in an M-zone subframe. Referring to FIG. 3(c), the M-zone subframe may start with an A-preamble, followed by a midamble and an SFH. Referring to FIG. 3(d), a midamble, an SFH and an A-preamble may be allocated in this order in an M-zone subframe. The allocation orders of an A-preamble, an SFH and a midamble illustrated in FIGS. 3(a) to 3(d) are purely exemplary. An A-preamble, an SFH and a midamble may be allocated in any possible order.

The midamble may be allocated at various positions in an M-zone subframe as described above. The BS may transmit the midamble to 16m MSs in an M-zone subframe of every frame.

In the case where the foregoing Type-2 subframe with seven symbols is allocated to the M zone in a frame structure with a channel bandwidth of 5, 10 or 20 MHz, a Type-3 subframe which consists of five symbols is produced. The Type-3 subframe may be located at any position other than the first DL subframe. However, since the first DL subframe allocated to the L zone may have an odd number of symbols and each of the other L-zone subframes has an even number of symbols, the Type-3 subframe with five symbols is preferably allocated before or after the Type-2 subframe with seven symbols.

FIGS. 4 to 7 illustrate exemplary frame structures with different ratios between DL L-zone subframes and DL M-zone subframes for a channel bandwidth of 5, 10 or 20 MHz, which are designed to support both a legacy MS and an AMS.

Figure 4:
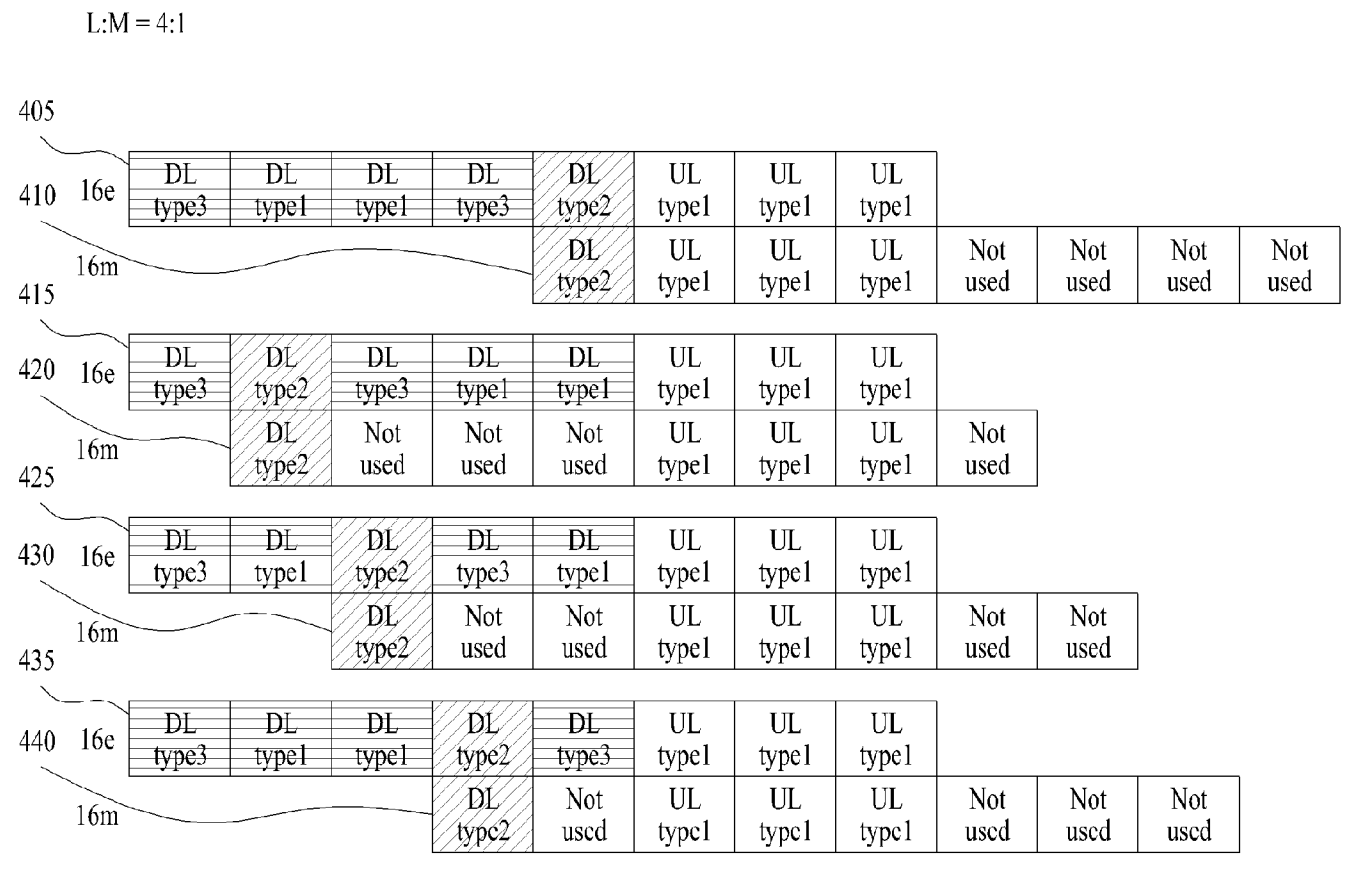

Frames illustrated in FIGS. 4 to 7 includes DL L-zone subframes and DL M-zone subframes, a ratio of the number of DL L-zone subframes to the number of DL M-zone subframe(s) is 4:1, 3:2, 2:3 and 1:4, respectively. Subframes marked with slashed lines represent M-zone subframes and subframes marked with horizontal lines represent L-zone subframes. Particularly, FIG. 4 illustrates frame structures seen from the viewpoints of a 16e MS and a 16m MS, whereas FIGS. 5, 6 and 7 illustrate only frame structures seen from the viewpoint of a 16e MS.

Referring to FIG. 4, the ratio of the number of DL L-zone subframes to the number of DL M-zone subframes may be 4:1. Accordingly, the BS may allocate one DL subframe to the M zone for 16m MSs in a specific frame. That is, the 16m MSs may receive a signal only through the one downlink (DL) subframe allocated to the m-zone in the specific frame. For example, if a small number of 16m MSs exist in a specific cell, only one DL subframe may be allocated to the M-zone in a frame. In the case where only one DL subframe is allocated to the M-zone designed for 16m MSs in a specific frame, the M-zone subframe may be any DL subframe other than the first DL subframe in frame structures 405, 415, 425 and 435 seen from the viewpoint of 16e MSs. Preferably, the M-zone subframe is located as the second or third downlink (DL) subframe as in the frame structures 415 and 425 seen from the viewpoint of 16e MSs.

When the DL M-zone subframe is allocated at the second or third DL subframe position in the frame structures 415 and 425 seen from the viewpoint of 16e MSs, this DL M-zone subframe may be configured to be a Type-2 subframe.

From the part of 16m MSs, the Type-2 DL subframe may be interpreted as the first (or start) DL subframe of the M zone. Consequently, the frame structures 405, 415, 425, and 435 seen from the viewpoint of 16e MSs are equivalent to frame structures 410, 420, 430 and 440 seen from the viewpoint of 16m MSs in FIG. 4.

Thus, the frame structure 420 seen from the viewpoint of 16m MSs may be considered to include a DL-subframe-a DL subframe supporting only 16e MSs-a DL subframe supporting only 16e MSs-a DL subframe supporting only 16e MSs-a UL subframe-a UL subframe-a UL subframe-a DL subframe supporting only 16e MSs in this order. That is, the frame structure 420 may be interpreted as having the M zone that is allocated from the start of five DL subframes except for UL subframes and having the L zone that is allocated from the end of the DL subframes. Also, the frame structure 430 seen from the viewpoint of 16m MSs may be considered to include a DL-subframe-a DL subframe supporting only 16e MSs-a DL subframe supporting only 16e MSs-a UL subframe-a UL subframe-a UL subframe-a DL subframe supporting only 16e MSs-a DL subframe supporting only 16e MSs in this order.

In the frame structures 410, 420, 430 and 440 seen from the viewpoint of 16m MSs, the first DL subframe of the M zone is a Type-2 subframe which consists of seven symbols. When the M zone includes only one DL subframe as illustrated in FIG. 4, the 'DL length' of the M zone may be expressed as 1.

In the frame structure 415 seen from the viewpoint of 16e MSs, the M-zone DL subframe is the second DL subframe and thus the 'DL offset' of the M zone may be expressed as 1. In the frame structure 425 seen from the viewpoint of 16e MSs, the M-zone DL subframe is the third DL subframe and thus the 'DL offset' of the M zone may be expressed as 2.

The term 'DL offset' is used interchangeably with 'Frame_Offset'. A DL offset may be defined as the number of DL L-zone subframes existing before the first DL M-zone subframe in the frame structures 415 and 425 seen from the viewpoint of 16e MSs. That is, the first DL M-zone subframe may be behind the first DL L-zone subframe by one or two subframes.

In the illustrated cases of FIGS. 4 to 7, if the M-zone Type-2 subframe with seven symbols is fixed as the second DL subframe in the frame structure 415 seen from the viewpoint of 16e MSs, a Type-3 subframe, a Type-2 subframe, a Type-3 subframe, a Type-1 subframe, and a Type-1 subframe may be sequentially allocated in this order in the DL region of the frame. The first DL subframe of Type-3 is allocated as an L-zone subframe and the second DL subframe of Type-2 is allocated as an M-zone subframe. Then the ratio of the number of DL L-zone subframes to the number of DL M-zone subframes may be determined according to how the subsequent Type-3, Type-1 and Type-1 subframes are allocated.

Referring to FIGS. 5, 6 and 7, if the first DL M-zone subframe is a Type-1 subframe with six symbols and the second DL M-zone subframe is a Type-2 subframe with seven symbols, the BS may transmit a midamble to 16m MSs through one symbol of the Type-2 subframe. That is, the BS may independently use one symbol of the Type-2 subframe to transmit a midamble. Therefore, the Type-2 subframe with seven symbols may take the form of a Type-1 subframe and one independent symbol.

The positions of M-zone and L-zone subframes illustrated in FIGS. 4 to 7 are purely exemplary.

If the frame structures illustrated in FIGS. 4 to 7 are used, the number of symbols allocated to the L zone in a specific frame may be determined as follows. If three or fewer subframes are allocated to the L zone, the number of L-zone symbols is 5+6×(number of DL subframes allocated to Lzone-1). If the number of DL L-zone subframes is 4 or larger, the number of L-zone symbols is calculated by 5+6× (number of DL subframes allocated to L zone-1)−1. That is, the number of L-zone symbols may be computed by 5+6× (number of DL subframes allocated to L zone-1)−floor(number of DL subframes allocated to L zone/4). The floor(K) function represents a maximum integer equal to or less than K.

In the case where legacy MSs (e.g. 16e MSs) are supported in the manners illustrated in FIGS. 4 to 7, a Type-2 subframe is allocated to the M zone for 16m MSs. As a result, a Type-3 subframe may be further generated, compared to a conventional frame structure. In this case, the L zone starts with the Type-3 subframe(i.e, first DL subframe is type-3 subframe in L zone). If two or more subframes are allocated to the L zone, a Type-1 subframe may be allocated with priority to the L zone, since the L zone needs to contain an odd number of symbols. On the other hand, if the M zone has only one DL subframe, a Type-3 subframe may be allocated to the L zone even though the L zone eventually includes an odd number of symbols. A Type-3 subframe may be located at any position in FIGS. 4 to 7.

As described above, the BS may configure subframe types in a frame structure in such a manner that an A-preamble, an SFH and a midamble may be transmitted to 16m MSs through a Type-2 subframe which consists of seven symbols in the M zone.

Figure 8:
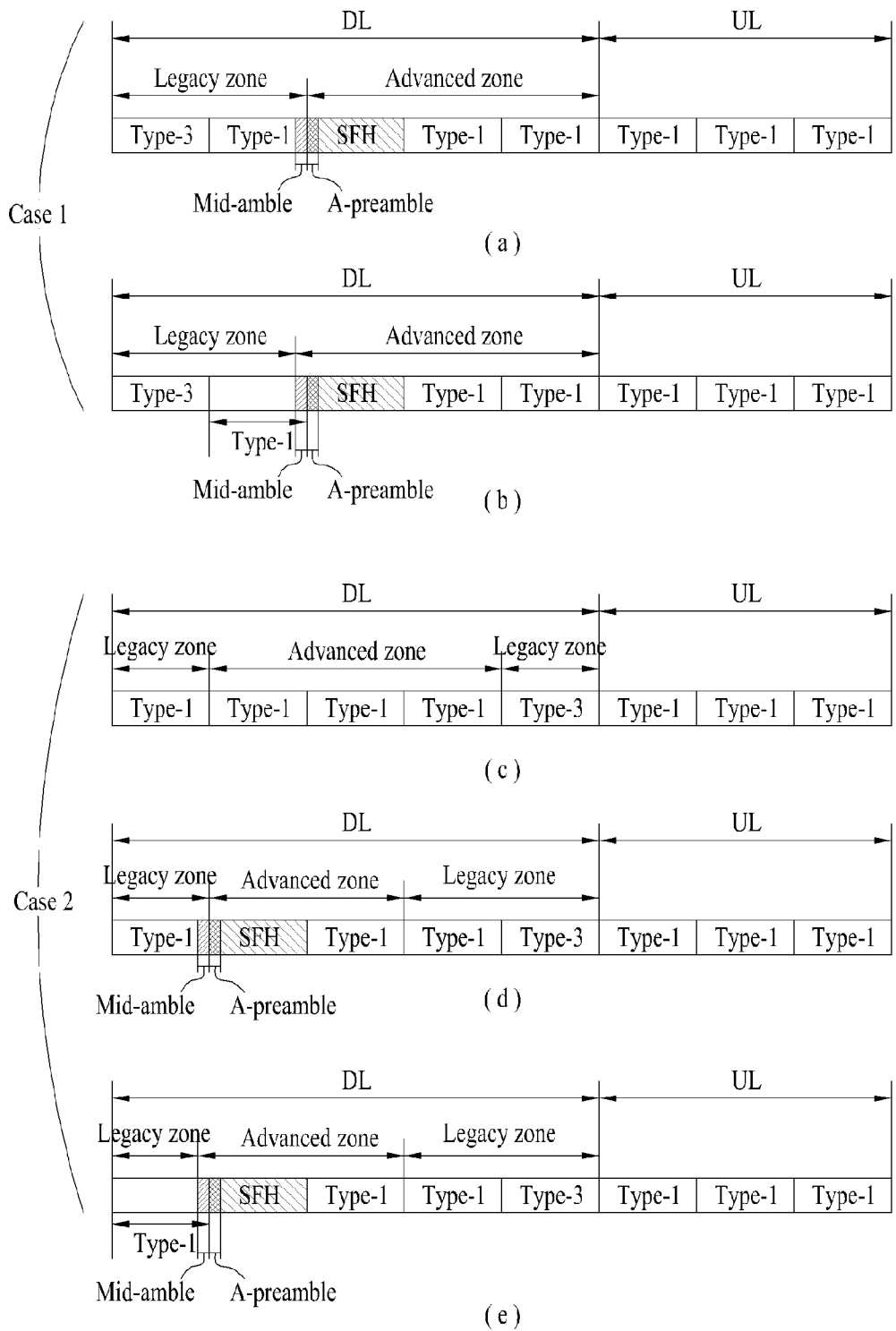
FIG. 8 illustrates exemplary methods for transmitting a midamble in a frame structure for a channel bandwidth of 5, 10 or 20 MHz at a Base Station (BS).

FIG. 8 illustrates exemplary methods for transmitting a midamble in a frame structure with a channel bandwidth of 5, 10 or 20 MHz at a BS.

Referring to FIGS. 8(*a*) and 8(*b*) illustrating an embodiment of a midamble transmission method (Case 1), four Type-1 subframes and one Type-3 subframe may be allocated to the DL region of a TDD frame with a 5:3 DL-UL subframe ratio in a conventional Greenfield operation. An FDD frame may be configured to be capable of additionally transmitting a midamble, while still having eight Type-1 subframes.

In FIG. 8(*a*), the BS may configure all M-zone subframes (i.e. advanced-zone subframes) to be Type-1 subframes and set the OFDMA symbol right before a first M-zone subframe for a midamble. Thus, the L zone includes 5+6×(number of DL subframes allocated to L zone-1). If the M zone includes a single DL subframe, the L zone may have 5+6×(number of DL subframes allocated to L zone-1)–floor(number of DL subframes allocated to L zone/4).

In FIG. 8(*b*), the BS may configure DL M-zone subframes to be Type-1 and Type-2 subframes and allocate a midamble to the first DL M-zone subframe.

Referring to FIGS. 8(*c*), 8(*d*) and 8(*e*) illustrating another embodiment of the midamble transmission method (Case 2), in a TDD frame with a 5:3 DL-UL subframe ratio (e.g. four consecutive Type-1 DL subframes and one last Type-3 DL subframe), the M zone (i.e. the advanced zone) may have any of the remaining four DL subframes except for the first DL subframe in a Greenfield operation.

As illustrated in FIG. 8(*d*), the last symbol of the previous subframe to a first M-zone subframe may be used for a midamble. In this case, if the M zone is set to always start from the second subframe (or Frame_Offset is fixed), for example, irrespective of the ratio between DL L-zone subframes and DL M-zone subframes, the BS may transmit the midamble through the last symbol of the first DL subframe. Herein, the L zone may include 6× number of DL subframes allocated to L zone-ceil ((number of DL subframes allocated to L zone-1)/3) symbols. The ceil(K) function represents a minimum integer equal to or larger than K. As illustrated in FIG. 8(*e*), if the midamble is carried in the M zone, the L zone may have 5+6×(number of DL subframes allocated to L zone-1)–ceil((number of DL subframes allocated to L zone-1)/3) symbols.

In this manner, the conventional frame structure for a Greenfield operation is still used without modifying subframe types. Therefore, subframe alignment may be maintained between adjacent carriers such as multiple carriers.

In the embodiments of the midamble transmission method illustrated in FIG. 8, the BS preferably allocates a Type-3 subframe as the third DL L-zone subframe in order to make the second DL L-zone subframe consists of an even number of symbols. Referring to FIG. 8(*d*), if a midamble is delivered in the L zone, the L zone may have 6×(number of DL subframes allocated to L zone)–floor(number of DL subframes allocated to L zone/4). Referring to FIG. 8(*e*), if a midamble is delivered in the M zone, the L zone may have 5+6×(number of DL subframes allocated to L zone-1)–floor(number of DL subframes allocated to L zone/4). In this case, in order to allocate a single subframe to the M zone, the last DL subframe may be changed from Type-3 to Type-1 and the midamble may be carried in the last symbol of the last subframe of L zone.

The term 'number of DL subframes allocated to L zone subframes' may be interchangeable with any other term that has the same meaning.

A midamble transmitted according to the foregoing midamble transmission methods may be commonly received at MSs that are serviced in the M zone and the L zone, from the BS. This means that the MSs serviced in the M and L zones may read a symbol carrying the midamble in the M and L zones.

In summary of FIG. 8, when the BS transmits a midamble through the first symbol of the first DL subframe or the last symbol of the previous subframe to the first DL subframe in M-zone, the midamble is included in the L zone or the M zone.

FIG. 9 illustrates exemplary frame structures with different ratios between DL L-zone subframes and DL M-zone subframes, when one symbol is used as a midamble in the midamble transmission methods according to the embodiments of the present invention illustrated in FIG. 8.

The BS may transmit a midamble in one symbol right before the first DL subframe of M zone. Because the midamble occupies one symbol of the DL subframe previous to the first DL subframe of M zone, the number of symbols in the L zone may be decreased by one. Therefore, type of the subframe right before to the start of the M zone may be changed from Type-1 to Type-3. The Type-3 subframe is located at any position in the L zone. Accordingly, the number of L-zone symbols may be computed by 5+6× (FRAME_OFFSET−1)–floor(FRAME_OFFSET/4), taking into account all possible ratios between DL L-zone subframes and DL M-zone subframes. FRAME_OFFSET represents the number of DL subframes allocated to the L zone.

FIG. 10 illustrates a TDD AAIF structure and FDD AAIF structures.

Referring to FIG. 10, if a TDD frame is configured in the above-described manner to support legacy MSs (e.g. 16e MSs), the AAIF structures may maintain subframe alignment between a frame structure supporting 16e MSs and a frame structure supporting only 16m MSs in a multi-carrier operation. A TDD AAIF and an FDD AAIF may support MSs using different frame configurations.

FIGS. 11 and 12 illustrate exemplary frame structures with different ratios between DL L-zone subframes and DL M-zone subframes for a channel bandwidth of 8.75 MHz, which are designed to support both legacy MSs and AMSs.

Referring to FIGS. 11 and 12, a frame structure with a channel bandwidth of 8.75 MHz and a CP length equal to ⅛ of a useful symbol time may support various ratios between DL L-zone subframes and DL M-zone subframes. The ratio of the number of DL L zone subframes to the number of DL M zone subframe may be one of 4:1, 3:2, 2:3 and 1:4. To support these ratios, the BS may configure a frame by allocating a Type-2 subframe which consists of seven symbols to the M zone.

The Type-2 subframe which consists of seven symbols may be allocated to be any DL subframe except for the first DL subframe. Considering transmission of control signals (e.g. an A-preamble, a midamble and an SFH) from a BS, the Type-2 subframe is preferably located at the position of the second or third DL subframe as in a frame structure with a channel bandwidth of 5, 10 or 20 MHz.

As illustrated in FIGS. 11 and 12, because 15 symbols are allocated to the UL region of the L zone, there exists a Type-4 subframe which consists of nine symbols in the UL region. Thus three symbols are generated in the DL region and allocated to the first DL subframe of L zone. If a minimum number of symbols required to support legacy MSs is larger than 3, the BS may allocate a subframe which consists of five symbols as the first DL subframe of L zone. The DL region includes a Type-3 subframe which consists of five symbols and a Type-2 subframe which consists of seven symbols. Because the Type-2 subframe is allocated to the M zone, the Type-3 subframe is allocated to the L zone. As a result, the number of L-zone symbols may be expressed as 5×(number of DL subframes allocated to L zone).

FIGS. 11 and 12 illustrate frame structures with DL L-zone subframes and DL M-zone subframes at 4:1, 3:2, 2:3 and 1:4. Subframes marked with slashed lines represent M-zone subframes and subframes marked with horizontal lines represent L-zone subframes. Particularly, FIG. 11 illustrates frame structures from the viewpoint of 16e MSs and 16m MSs, whereas FIG. 12 illustrates only frame structures from the viewpoint of 16e MSs.

Referring to FIG. 11, a ratio of number of DL L zone subframes to number of DL M zone subframe(s) is 4:1. That is, the BS may allocate one DL subframe to the M zone designed for 16m MSs in the DL region of a specific frame. Thus 16m MSs may receive a signal only through the one DL subframe in the M zone of the specific frame. In this case, the frame structure with a 4:1 DL L-M zone subframe ratio may be used when a small number of 16m MSs exist in a cell. In the case where a BS allocates only one subframe to the M zone for 16m MSs in the DL region of a specific frame, the DL M-zone subframe may be any of DL subframes other than the first DL subframe in frame structures 1110 and 1130 seen from the viewpoint of 16e MSs. Preferably, the DL M-zone subframe is allocated as the second or third DL subframe as in the frame structures 1110 and 1130.

These frame structures 1110 and 1130 may be regarded as frame structures 1120 and 1140 from the viewpoint of 16m MSs. Thus a 16m MS may determine from the frame structures 1120 and 1140 that the Type-2 subframe with seven symbols is the first DL M-zone subframe. Consequently, the 16m MS may determine that a DL-subframe-a DL subframe supporting only 16e MSs-a DL subframe supporting only 16e MSs-a DL subframe supporting only 16e MSs-a UL subframe-a UL subframe-a DL subframe supporting only 16e MSs are arranged in this order in the frame structures 1120 and 1140.

That is, the frame structures 1120 and 1140 may be interpreted as having the M zone that is allocated from the start of the DL subframes except for the UL subframes and as having the L zone that is allocated from the end of the DL subframes.

If the M zone includes only one DL subframe as in the frame structures illustrated in FIG. 11, it may be said that the 'DL length' of the M zone is 1. Since the DL M-zone subframe is the second DL subframe in the frame structures 1110 and 1130 seen from the viewpoint of 16e MSs, the 'DL offset' of the M zone may be expressed as 1. If the DL M-zone subframe is the third DL subframe in the frame structures 1110 and 1130 seen from the viewpoint of 16e MSs, the 'DL offset' of the M zone may be expressed as 2.

The term 'DL offset' is used interchangeably with 'Frame_Offset'. A DL offset may be defined as the number of DL L-zone subframes existing before the first DL M-zone subframe in the frame structures 1110 and 1130 seen from the viewpoint of 16e MSs. That is, the first DL M-zone subframe may be behind the first DL L-zone subframe by one or two subframes.

FIG. 13 illustrates other exemplary frame structures with different ratios between DL L-zone subframes and DL M-zone subframes for a channel bandwidth of 8.75 MHz, which are designed to support both legacy MSs and AMSs.

As illustrated in FIG. 13, because 15 symbols are allocated to the UL area of the L zone in a frame, the DL region of the frame may be configured to include a Type-3 subframe with five symbols and a Type-1 subframe with six symbols using three symbols generated in the DL region. According to the frame configuration, the L zone and the M zone may be configured as follows. Two Type-2 subframes in the DL region are not limited to any specific positions. However, it is preferred to place the Type-2 subframes such that an odd number of symbols are positioned at the start of the L zone. The M zone may be configured by allocating the remaining DL subframes except for the first DL subframe according to the ratio between DL L-zone subframes and DL M-zone subframes. In the case where only one DL subframe is allocated to the M zone, the DL M-zone subframe may be a Type-1 subframe.

Referring to FIG. 13, as in the first embodiment of the midamble transmission method illustrated in FIG. 8 (Case 1), the BS may transmit a midamble through the symbol right before to the first DL M-zone subframe. Due to transmission of the midamble, the number of L zone symbols is an even number. To maintain an odd number of symbols in the L zone after the midamble transmission, a frame may be configured by allocating a Type-1 subframe to the L zone in FIG. 13 so that an even number of symbols are allocated to the L zone.

FIG. 14 illustrates other exemplary frame structures with different ratios between DL L-zone subframes and DL M-zone subframes for a channel bandwidth of 8.75 MHz, which are designed to support both legacy MSs and AMSs.

Referring to FIG. 14, a frame is configured such that the number of symbols allocated to L zone is an odd number after midamble transmission, in the case where the BS transmits a midamble in the symbol right before to the first DL M-zone subframe.

FIG. 15 illustrates exemplary methods for transmitting a midamble in a frame structure for a channel bandwidth of 8.75 at a BS.

The method for transmitting a midamble through the symbol right before to the first DL M-zone subframe is also applicable to conventional frame structures with various ratios between DL L-zone subframes and DL M-zone subframes, designed to support legacy MSs. Referring to FIG. 15(a), the BS may allocate one symbol to the L zone to transmit a midamble. Referring to FIG. 15(b), the BS may allocate one symbol to the M zone to transmit a midamble. MSs serviced in the M zone and the L zone may commonly receive the midamble from the BS.

FIG. 16 illustrates exemplary frame structures with different ratios between DL L-zone subframes and DL M-zone subframes, when one symbol carries a midamble in the midamble transmission methods illustrated in FIG. 15.

Referring to FIG. 16, frames are configured according to different DL L-M zone subframe ratios, in the case where legacy MSs are supported in the frame structures of FIG. 15. Each zone has a different configuration depending on whether a symbol carrying a midamble is located in the L zone or the M zone.

The BS transmits the midamble through the symbol previous to the first DL M-zone subframe. Thus, the M zone may contain a Type-2 subframe. Accordingly, the last DL M-zone subframe may be converted from Type-1 to Type-3 in the frame structures of FIG. 16. If only one DL subframe is allocated to the M zone, the number of symbols in the L zone may be reduced by one. The number of symbols allocated to the L zone may be computed by 3+6×(FRAME_OFFSET−1)−floor(FRAME_OFFSET/4), taking into account all possible ratios between DL L-zone subframes and DL M-zone subframes. FRAME_OFFSET represents the number of DL subframes allocated to the L zone.

Because three DL symbols generated in the DL region are allocated to the L zone, the BS needs to allocate at least one Type-1 subframe to the L zone in order to transmit a midamble. To avoid this frame configuration constraint, a frame may be configured in the frame structures illustrated in FIG. 17.

FIG. 17 illustrates exemplary frame structures for a channel bandwidth of 8.75 MHz, designed to support legacy MSs.

Referring to FIG. 17, the BS may transmit a midamble to MSs in a frame including a Type-2 subframe with seven symbols which is configured using three symbols allocated to the L zone. A Type-1 subframe is not limited to any specific position in the DL region. If the Type-1 subframe is in the L zone, the number of symbols in the L zone may be 6+7×(number of DL subframes allocated to L zone−1). If the Type-1 subframe is allocated to the M zone, the number of symbols in the L zone may be 7×(number of DL subframes allocated to L zone).

When the ratios of number of DL L-zone subframes to number of DL M-zone subframes, 1:3, 2:2 and 3:1 are supported using the frame structures of FIG. 17, the BS may also transmit a midamble through a Type-2 subframe allocated to the M zone as described above. For instance, if a Type-2 subframe, a Type-2 subframe, a Type-2 subframe, and a Type-1 subframe are allocated in this order to the DL region, the BS may fix the start position of the M zone to the second DL subframe and transmit a midamble through a Type-2 subframe allocated as the second DL subframe. On the other hand, the BS may transmit a midamble through the symbol right before to the first DL M-zone subframe.

FIG. 18 illustrates frame structures for a channel bandwidth of 5, 10 or 20 MHz, configured for subframe alignment between a frame supporting only legacy MSs and a frame supporting only AMSs in a multi-carrier operation, when the number of symbols allocated to the L zone is equal to 5×(number of DL subframes allocated to L zone). If a 3-symbol subframe exists in a DL L zone in a frame structure with a channel bandwidth of 5, 10 or 20 MHz, subframe alignment may not be achieved between the frame structure and a frame structure supporting only AMSs (e.g. 16e MSs). As illustrated in FIG. 18, a TDD frame and an FDD frame may have different types of subframes and may support MSs in different frame structures.

FIG. 19 illustrates exemplary frame structures with different ratios between DL L-zone subframes and DL M-zone subframes for a channel bandwidth of 7 MHz, designed to support both legacy MSs and AMSs.

FIGS. 19(a) and 19(b) illustrate frame configuration that the ratios of number of DL L-zone subframes to number of DL M-zone subframes is 2:1 and 1:2, respectively. Subframes marked with slashed lines are M-zone subframes and subframes marked with horizontal lines are L-zone subframes.

FIG. 19(a) illustrates frame structures seen from the viewpoints of 16e MSs and 16m MSs, separately, while FIG. 19(b) illustrates only frame structures seen from the viewpoint of 16e MSs.

Referring to FIG. 19(a), the ratio of number of DL L-zone subframes to number of DL M-zone subframes may be 2:1. This means that the BS may allocate only one DL subframe to the M zone for 16m MSs in the DL region of a specific frame. Thus the 16m MSs may receive a signal only through the one DL M-zone subframe of the frame. In general, the one DL subframe is allocated to M zone in the case where a small number of 16m MSs exist in a cell. In this case, the DL M-zone subframe may be any of DL subframes except for the first DL subframe in frame structures 1910 and 1930 seen from the viewpoint of 16e MSs. Preferably, the DL M-zone subframe is allocated as the second or third DL subframe as in the frame structures 1910 and 1930.

When the DL M-zone subframe is allocated as the second or third DL subframe in the frame structures 1910 and 1930 seen from the viewpoint of 16e MSs, the DL M-zone subframe is a Type-2 subframe with seven symbols.

From the viewpoint of 16m MSs, the Type-2 subframe may be considered to be the first DL M-zone subframe. Thus the frame structures 1910 and 1930 are interpreted to be frame structures 1920 and 1940 illustrated in FIG. 19(a) from the part of the 16m MSs.

Accordingly, the frame structure 1920 seen from the viewpoint of 16m MSs may be interpreted as having a DL-subframe-a DL subframe supporting only 16e MSs-a UL subframe-a UL subframe-a DL subframe supporting only 16e MSs in this order. That is, the frame structure 1920 may be interpreted as having the M zone which is allocated from the start of the three DL subframes except for the UL subframes and having the L zone which is allocated from the end of the DL subframes. In addition, the frame structure 1940 seen from the viewpoint of 16m MSs may be interpreted as having a DL-subframe-a DL subframe supporting only 16e MSs-a UL subframe-a UL subframe-a DL subframe supporting only 16e MSs in this order.

As described above, the first DL subframe allocated to M zone is a Type-2 subframe with seven symbols in the frame structures 1920 and 1940 seen from the viewpoint of 16m MSs. If the M zone consists of only one DL subframe as in frame structures illustrated in FIG. 19(a), it may be said that the 'DL length' of the M zone is 1.

Since the DL M-zone subframe is the second DL subframe in the frame structures 1910 and 1930 seen from the viewpoint of 16e MSs, the 'DL offset' may be expressed as 1. A DL offset may be defined as the number of DL L-zone subframes existing before the first DL M-zone subframe in the frame structures 1910 and 1930 seen from the viewpoint of 16e MSs. That is, the first DL M-zone subframe may be behind the first DL L-zone subframe by one subframe.

As illustrated in FIG. 19, a frame structure with a CP length of ⅛ for a channel bandwidth of 7 MHz may consists of five subframes. To support various ratios between DL L-zone subframes and DL M-zone subframes in a DL region (e.g. 2:1 or 1:2), the BS may configure a frame by allocating a Type-2 subframe to the M zone. The Type-2 subframe may be any of DL subframes except for the first DL subframe. However, considering transmission of control information or signal transmission and a fixed position of an SFH irrespective of the ratio between DL L-zone subframes and DL M-zone subframes as in a frame structure for a channel bandwidth of 5, 10 or 20 MHz, it is preferred to allocate the Type-2 subframe as the second DL subframe in the DL region.

The Type-2 subframe with seven symbols in the M zone includes an A-preamble, an SFH, and a midamble. Since 12 symbols are allocated to the UL region of the L zone, the DL region may have 9 symbols. In this case, the 9 symbols may be allocated to the L zone, particularly at the start of the L zone. Considering the ratio between DL L-zone subframes and DL M-zone subframes, 9 symbols is too many for the start of the L zone. Hence, the BS may allocate a Type-2 subframe with seven symbols as the first DL L-zone subframe in order to efficiently allocate symbols to the L zone and the M zone.

When the first DL L-zone subframe is a Type-2 subframe, the L zone consists of only Type-2 subframes. Therefore, the number of symbols allocated to the L zone is 7×(number of DL subframes allocated to L zone).

FIG. 20 illustrates exemplary frame structures for a channel bandwidth of 7 MHz, configured for subframe alignment between a frame supporting only legacy MSs and a frame supporting only AMSs in a multi-carrier operation.

Specifically, FIG. 20 illustrates a 16m TDD frame structure for subframe alignment between a frame supporting only legacy MSs (e.g. 16e MSs) and a frame supporting only AMSs (e.g. 16m MSs) in a multi-carrier operation. The BS may support 16m MSs using the frame structures of FIG. 20. Because a frame includes Type-1 subframes each having six symbols and Type-2 subframes each having seven symbols, the BS may support MSs by making TDD and FDD frame structures identical or different.

If 16m MSs are supported with a 16m TDD frame with a CP length of ⅛ for a channel bandwidth of 7 MHz as illustrated in FIG. 20, the BS may configure all DL subframes to be Type-2 subframes with seven symbols. Only an A-preamble and an SFH may be located in the first subframe or a specific DL subframe of the frame. Six symbols are required to configure these control signals. Since the DL region of a frame consists of only Type-2 subframes in the proposed frame structures of FIG. 20, six symbols are used to transmit the A-preamble and the SFH and the remaining one symbol may be used to transmit a midamble. In this manner, the BS may simultaneously transmit the A-preamble, the SFH and the midamble to 16m MSs.

FIG. 21 illustrates exemplary methods for transmitting a midamble in a frame structure for a channel bandwidth of 7 MHz at a BS.

Referring to FIG. 21(a), when the BS transmits a midamble through the last symbol of the subframe previous to the first DL M-zone subframe, the BS may still use a conventional subframe structure. In this case, the number of symbols allocated to the L zone is 9+6(number of DL subframes allocated to L zone-1). However, an even number of symbols are available for the L zone because one symbol of an L-zone subframe is used to transmit the midamble.

Unlike FIG. 21(a), the BS may transmit a midamble through a DL M-zone subframe, particularly the first DL M-zone subframe.

As illustrated in FIG. 21, a DL region may include a Type-4 subframe with nine symbols and Type-1 subframes with six symbols. Considering a symbol allocated for transmission of a midamble, the number of symbols allocated to the L zone is 9+6×(number of DL subframes allocated to L zone-1) and the actual number of symbols allocated to the L zone is 8+6× (number of DL subframes allocated to L zone-1) by subtracting one symbol used for the midamble from the number of symbols allocated to the L zone.

Meanwhile, the BS may allocate one symbol to a DL M-zone subframe to transmit a midamble. Then a Type-1 subframe is converted to a Type-3 subframe in the M zone. As a result, the number of symbols allocated to the L zone is 9+5×(number of DL subframes to L zone-1).

FIG. 22 illustrates exemplary methods for transmitting a midamble in a frame structure for a channel bandwidth of 7 MHz at a BS.

Referring to FIG. 22, in the case where a BS transmits a midamble in the symbol previous to the first DL M-zone subframe, frames are configured so as to more efficiently use symbols. The DL region of a frame may include 10 symbols, a Type-1 subframe, and a Type-3 subframe, for transmission of a midamble. Referring to FIG. 22(a), if a symbol carrying a midamble is allocated to the L zone, the number of symbols allocated to L zone may be 10+5×(number of DL subframes allocated to L zone-1). Considering the midamble, the actual number of symbols allocated to the L zone may be 9+5× (number of DL subframes allocated to L zone-1).

Unlike FIG. 22(a), when a symbol carrying a midamble is allocated to the M zone as illustrated in FIG. 22(b), the L zone may include 9+5×(number of DL subframes allocated to L zone-1).

If the BS uses the last symbol of the subframe previous to the first DL M-zone subframe to transmit a midamble as described above, MSs serviced in the M zone and the L zone may commonly receive a symbol carrying the midamble.

FIG. 23 illustrates frame structures with different ratios between DL L-zone subframes and DL M-zone subframes for a channel bandwidth of 7 MHz, designed to support both legacy MSs and AMSs based on the frame structures illustrated in FIG. 22. The ratios between DL L-zone subframes and DL M-zone subframes are 2:1 and 1:2, respectively in FIGS. 23(a) and 23(b).

As described above, a 16m MS can receive data and control information such as a preamble, a midamble, and an SFH in the first DL M-zone subframe. The 16m MS can measure the DL channel state of a DL M-zone subframe using the received midamble.

When legacy MSs are supported in the above-described manner, both a BS and an MS may prior knowledge of a frame configuration. For example, the BS and the MS may preserve a preset frame configuration table listing ratios between DL subframes and UL subframes, ratios between DL L-zone subframes and DL M-zone subframes, numbers of DL subframes allocated to the M zone, and subframe types. The BS may transmit the index of a specific frame configuration to the MS in a Secondary-SFH SubPacket-1 (S-SFH SP-1), An S-SFH is transmitted in every superframe and the S-SFH SP-1 is one of the three subpackets of the S-SFH.

As is apparent from the above description, in a cell environment where a legacy MS and an AMS co-exist, the AMS can efficiently conduct communication using a frame structure of the present invention.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment or may be replaced with corresponding constructions of another embodiment. It will be obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for receiving a signal in a wireless communication system supporting both communication of a first Mobile Station (MS) using a first wireless communication scheme and communication of a second MS using a second wireless communication scheme, the method comprising:

receiving, by the second MS, a downlink signal in a downlink subframe allocated to a second zone dedicated to communication of the second MS in a downlink zone of a specific frame, wherein a number of the downlink subframes allocated to the second zone is one, wherein the downlink subframe allocated to the second zone is located after a first downlink subframe of a first zone to be used for communication of the first MS by one subframe or two subframes in the specific frame, and wherein the downlink subframe allocated to the second zone is a Type-2 subframe having seven Orthogonal Frequency Division Multiple Access (OFDMA) symbols.

2. The method according to claim 1, wherein the reception comprises receiving, by the second MS, a preamble through a first OFDMA symbol of the downlink subframe allocated to the second zone.

3. The method according to claim 1, wherein the reception comprises receiving, by the second MS, a midamble through a last OFDMA symbol of the downlink subframe allocated to the second zone.

4. The method according to claim 1, wherein the reception comprises receiving, by the second MS, downlink data through five OFDMA symbols of the downlink subframe allocated to the second zone.

5. The method according to claim 1, wherein the specific frame has a channel bandwidth of one of 5 MHz, 10 MHz, 20 MHz, 8.75 MHz, and 7 MHz.

6. The method according to claim 5, wherein if the specific frame is a Time Division Duplex (TDD) frame having a channel bandwidth of one of 5 MHz, 10 MHz and 20 MHz, a ratio of a number of downlink subframes to a number of uplink subframes in the specific frame is 5:3.

7. The method according to claim 5, wherein if the specific frame is a Time Division Duplex (TDD) frame having a channel bandwidth of 8.75 MHz, a ratio of a number of downlink subframes to a number of uplink subframes in the specific frame is 5:2.

8. The method according to claim 5, wherein if the specific frame is a Time Division Duplex (TDD) frame having a channel bandwidth of 7 MHz, a ratio of a number of downlink subframes to a number of uplink subframes in the specific frame is 3:2.

9. The method according to claim 1, further comprising receiving, by the second MS from the BS, frame configuration information including information about the downlink subframe allocated to the second zone in the specific frame.

10. A Mobile Station (MS) for receiving a signal in a wireless communication system supporting communication using a plurality of different wireless communication schemes, the MS comprising:

a receiver for receiving from a Base Station (BS) a downlink signal in a downlink subframe allocated to a second zone in a downlink zone of a specific frame, the second zone being dedicated to the MS using a second communication scheme among the plurality of wireless communication schemes, wherein a number of the downlink subframes allocated to the second zone is one, wherein the downlink subframe allocated to the second zone is located after a first downlink subframe of a first zone to be used for another MS using a first communication scheme by one subframe or two subframes in the specific frame, wherein the downlink subframe allocated to the second zone is a Type-2 subframe having seven Orthogonal Frequency Division Multiple Access (OFDMA) symbols.

11. The MS according to claim 10, wherein the receiver receives a preamble through a first OFDMA symbol of the downlink subframe allocated to the second zone.

12. The MS according to claim 10, wherein the receiver receives a midamble through a last OFDMA symbol of the downlink subframe allocated to the second zone.

13. The MS according to claim 12, further comprising:

a processor for measuring a downlink channel state of the downlink subframe allocated to the second zone using the received midamble.

14. The MS according to claim 10, wherein the receiver receives downlink data through five OFDMA symbols of the downlink subframe allocated to the second zone.

15. The MS according to claim 10, wherein the specific frame has a channel bandwidth of one of 5 MHz, 10 MHz, 20 MHz, 8.75 MHz, and 7 MHz.

16. The MS according to claim 10, wherein the receiver further receives frame configuration information including information about the downlink subframe allocated to the second zone in the specific frame from the BS.

17. A method for receiving a signal in a wireless communication system supporting both communication of a first Mobile Station (MS) using a first wireless communication scheme and communication of a second MS using a second wireless communication scheme, the method comprising:

receiving, by the second MS, a downlink signal in a downlink subframe allocated to a second zone dedicated to communication of the second MS in a downlink zone of a specific frame, wherein a number of the downlink subframes allocated to the second zone is one, wherein the downlink subframe allocated to the second zone is located after a first downlink subframe of a first zone to be used for communication of the first MS by one subframe or two subframes in the specific frame, wherein the downlink subframe allocated to the second zone is a Type-2 subframe having seven Orthogonal Frequency Division Multiple Access (OFDMA) symbols, wherein the specific frame has a channel bandwidth of one of 5 MHz, 10 MHz, 20 MHz, 8.75 MHz, and 7 MHz, and wherein if the specific frame is a Time Division Duplex (TDD) frame having a channel bandwidth of one of 5 MHz, 10 MHz and 20 MHz, a ratio of a number of downlink subframes to a number of uplink subframes in the specific frame is 5:3, if the specific frame is a TDD frame having a channel bandwidth of 8.75 MHz, a ratio of a number of downlink subframes to a number of uplink subframes in the specific frame is 5:2, and if the specific frame is a TDD frame having a channel bandwidth of 7 MHz, a ratio of a number of downlink subframes to a number of uplink subframes in the specific frame is 3:2.

* * * * *